(12) United States Patent
Cui et al.

(10) Patent No.: US 12,167,286 B2
(45) Date of Patent: Dec. 10, 2024

(54) INTERRUPTION AND MEASUREMENT EXCEPTION WITH SMTC2-LP IN IDLE AND INACTIVE RRM

(71) Applicant: APPLE INC., Cupertino, CA (US)

(72) Inventors: Jie Cui, Cupertino, CA (US); Yushu Zhang, Beijing (CN); Chunxuan Ye, San Diego, CA (US); Dawei Zhang, Cupertino, CA (US); Haitong Sun, Cupertino, CA (US); Hong He, Cupertino, CA (US); Manasa Raghavan, Cupertino, CA (US); Oghenekome Oteri, San Diego, CA (US); Weidong Yang, San Diego, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 530 days.

(21) Appl. No.: 17/593,706

(22) PCT Filed: Apr. 15, 2021

(86) PCT No.: PCT/CN2021/087557
§ 371 (c)(1),
(2) Date: Sep. 23, 2021

(87) PCT Pub. No.: WO2022/021947
PCT Pub. Date: Feb. 3, 2022

(65) Prior Publication Data
US 2022/0312278 A1   Sep. 29, 2022

(51) Int. Cl.
*H04W 36/00* (2009.01)
*H04W 48/16* (2009.01)

(52) U.S. Cl.
CPC ....... *H04W 36/0088* (2013.01); *H04W 48/16* (2013.01)

(58) Field of Classification Search
CPC ......... H04W 36/0072; H04W 36/0088; H04W 36/08; H04W 48/16; H04W 24/08;
(Continued)

(56) References Cited

U.S. PATENT DOCUMENTS

2019/0306734 A1*  10/2019  Huang ................. H04W 24/08
2020/0053670 A1    2/2020  Jung et al.
(Continued)

FOREIGN PATENT DOCUMENTS

| CN | 110557976 A | 12/2019 |
|----|---|---|
| WO | 2019161569 A1 | 8/2019 |
| WO | 2020033688 A1 | 2/2020 |

OTHER PUBLICATIONS

3GPP TS 38.133 V16.4.0 (Jun. 2020) pp. 1, 45-47, and 96 (Year: 2020).*

(Continued)

*Primary Examiner* — Ricky Q Ngo
*Assistant Examiner* — David M Kayal
(74) *Attorney, Agent, or Firm* — Dorsey & Whitney LLP

(57) ABSTRACT

Systems and methods disclosed herein describe the use of synchronization signal/physical broadcast channel block measurement time configuration (SMTC) 2 low power (SMTC2-LP) configuration(s). For cell measurements, a UE may determine that an SMTC2-LP configuration for one or more carriers of one or more target cells is known, determine a periodicity of SMTC occasions of the carrier(s) based on data found in the SMTC2-LP configuration(s), and cancel a cell measurement of an inter-frequency cell based at least in part on the periodicity of the SMTC occasion(s). For cell re-selection, a UE may determine that an SMTC2-LP configuration for a carrier being used at a target cell is known and that a physical cell identity (PCI) of the target cell is found in data of the SMTC2-LP configuration, determine a (Continued)

maximum paging interruption time using this periodicity, and perform a cell reselection to the target cell within this time.

12 Claims, 11 Drawing Sheets

(58) Field of Classification Search
CPC ..... H04W 24/10; H04W 36/00; H04W 56/00; H04W 56/001; H04W 72/0453; Y02D 30/70; H04L 5/14
See application file for complete search history.

(56) References Cited

U.S. PATENT DOCUMENTS

| | | | | |
|---|---|---|---|---|
| 2021/0037403 | A1* | 2/2021 | Kim | H04W 24/08 |
| 2022/0279427 | A1* | 9/2022 | Hwang | H04W 48/16 |
| 2023/0080009 | A1* | 3/2023 | Wang | H04L 5/0091 |
| | | | | 370/252 |
| 2023/0127719 | A1* | 4/2023 | Kim | H04W 24/10 |
| | | | | 370/329 |

OTHER PUBLICATIONS

3GPP TS 38.331, "3rd Generation Partnership Project; Technical Specification Group Radio Access Network; NR; Radio Resource Control (RRC) protocol specification (Release 16)", V16.0.0, Mar. 2020, 835 pages.

Apple, "Rapportuer editorial CR in 38.133", R4-2009272 in revision of R4-2009106, 3GPP TSG-RAN4 Meeting #95e, Online, Change Request 38.133 CR 0886 rev 1 Current version 16.3.0, May 25-Jun. 5, 2020, 189 pages.

Mediatek Inc., "Discussion on RRM requirements in DRX mode", R4-1803673, 3GPP TSG-RAN WG4 Meeting #86 Bis, Melbourne, Australia, Agenda Item 7.9.4.1.3, Apr. 16-20, 2018, 10 pages.

PCT/CN2021/087557, International Search Report and Written Opinion, Jul. 15, 2021, 9 pages.

3GPP TS 38.133, "3rd Generation Partnership Project; Technical Specification Group Radio Access Network; NR; Requirements for support of radio resource management (Release 16)", V16.4.0, Jun. 2020, 1463 pages.

3GPP TS 38.331, "3rd Generation Partnership Project; Technical Specification Group Radio Access Network; NR; Radio Resource Control (RRC) protocol specification (Release 16)", V16.1.0, Jul. 2020, 906 pages.

* cited by examiner

INTERRUPTION AND MEASUREMENT EXCEPTION WITH SMTC2-LP IN IDLE AND INACTIVE RRM

TECHNICAL FIELD

This application relates generally to wireless communication systems, including target cell measurements of target cell(s) and cell-reselection to target cells using information from one or more synchronization signal/physical broadcast channel block measurement time configuration (SMTC) 2 low power (SMTC2-LP) configuration(s) for the target cell(s).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In various networks, synchronization signal blocks (SSBs) are transmitted on a carrier by a base station and received at a user equipment (UE). These SSBs are indexed (e.g., SSB1, SSB2 . . . . SSBn) so that the UE may uniquely identify each SSB. In some networks, the base station may send the SSBs on the carrier in a beamformed fashion (with various indexed SSBs being transmitted using various beamformings).

In these cases, at least some indexed SSBs of the carrier may be transmitted together in periodic bursts. In some of these cases, all of the SSBs for the carrier are transmitted in the periodic burst; in other cases, a subset of SSBs for the carrier are transmitted in the periodic burst.

The base station may inform the UE of a first configuration useful for receiving these periodic bursts on the carrier. This first configuration may be called a synchronization signal/physical broadcast channel block measurement time configuration (SMTC) configuration. The SMTC configuration may include a periodicity compatible with the reception of the periodic SSB bursts on the carrier (e.g., a periodicity that is equal to or a multiple of the periodicity of the SSB bursts on the carrier). The SMTC configuration may also include an offset (measured in a number of subframes) for the periodic SSB bursts on the carrier. In some cases, the periodicity and offset may be included in a single parameter, with the UE determining each of them separately using the parameter (e.g., a modulus operation on the parameter) The SMTC configuration may also include a duration of the periodic SSB bursts on the carrier. The SMTC configuration may be, for example, a legacy Rel-15 SMTC configuration.

In some instances, information corresponding to a second configuration useful for receiving the periodic bursts on a carrier may also be sent to the UE by the base station. This second configuration may be called an SMTC 2 low power (SMTC2-LP) configuration. The SMTC2-LP configuration may be, for example, a Rel-16 SMTC2-LP configuration.

Figure 1:
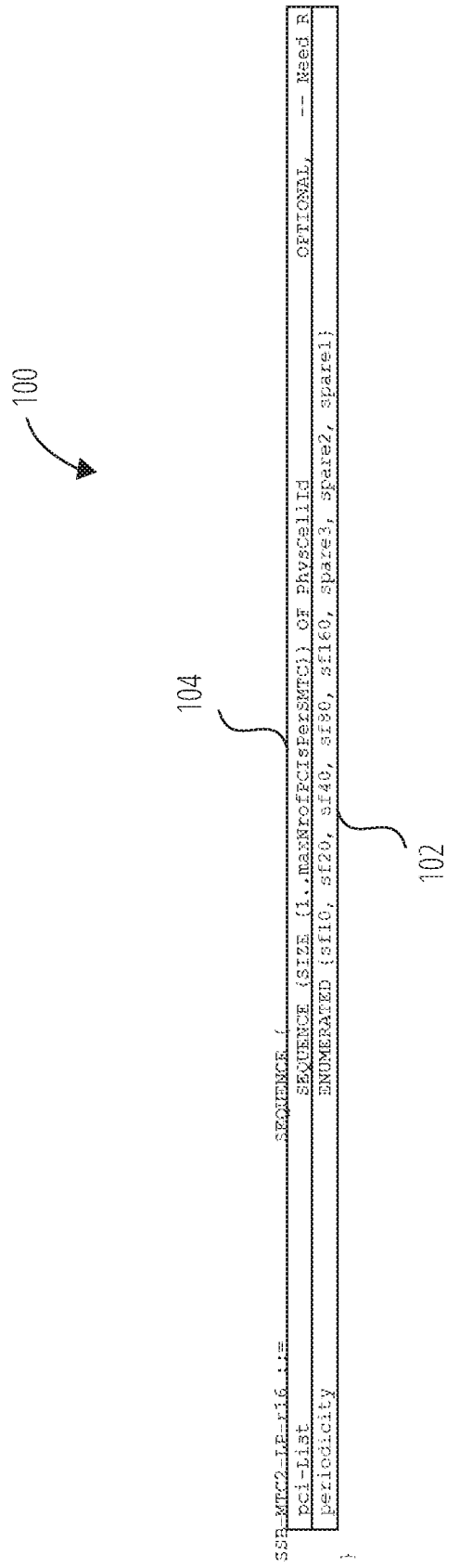
FIG. 1 illustrates an example information element for an SMTC2-LP configuration, according to an embodiment.

FIG. 1 illustrates an example information element 100 of an SMTC2-LP configuration, according to an embodiment. The information element 100 may include a periodicity field 102 indicating a periodicity of the SMTC2-LP configuration for the carrier. This periodicity may be compatible with the reception of SSB bursts on the carrier (e.g., a periodicity that is equal to or a multiple of the periodicity of the SSB bursts on the carrier). This periodicity may be different than the periodicity of the SMTC configuration. This periodicity may be a periodicity that is greater than (e.g., a multiple of) the periodicity specified in the SMTC configuration for the carrier. An information element 100 for the SMTC2-LP configuration for the carrier may also include a physical cell identity (PCI) list 104, which contains the PCIs of one or more cells on which the carrier is in use and for which cells the base station intends for the UE to use the SMTC2-LP configuration. An SMTC2-LP configuration may implicitly use the same offset and duration information received with the SMTC configuration for the carrier (e.g., the UE may simply re-use the offset and duration information from the SMTC configuration without re-communicating this information to the UE as part of the SMTC2-LP configuration).

The receipt of an SSB burst at the UE may be termed herein as an SMTC occasion. SMTC occasions may occur with a periodicity taken from the SMTC configuration when the SMTC configuration is selected for use by the UE, or SMTC occasions may occur with a periodicity taken from the SMTC2-LP configuration when the SMTC2-LP configuration is selected for use by the UE.

The use of a periodicity from the SMTC2-LP configuration rather than a periodicity from the SMTC configuration for the SMTC occasions may result in relative resource savings at either and/or both of the UE and the base station. A UE that receives the SSB burst of the carrier according to the longer periodicity of the SMTC2-LP configuration may use less power than a UE that receives the SSB burst of the carrier according to the shorter periodicity. A base station of the carrier providing SSB bursts according to the SMTC2-LP configuration accordingly needs to provide power for transmitting only for the less frequent SSB bursts on the carrier. Further, less frequent SSB bursts on the carrier frees up resources on that carrier that would have otherwise been used for some SSB bursts for other data.

Accordingly, a UE provided with an SMTC configuration and an SMTC2-LP configuration may receive the SSBs of the carrier according to at least one of the SMTC configuration and the SMTC2-LP configuration. When doing so, considerations may be made at the UE as to which configuration should be used for the carrier (e.g., whether to use the periodicity of the SMTC configuration for the carrier or the periodicity of the SMTC2-LP configuration for the carrier to receive the SSBs). Further, in some cases a UE may need to cancel a reception of the SSBs of a carrier according to an SMTC2-LP configuration for the carrier that it would otherwise perform. Considerations along these lines may be applicable in at least two cases when a UE is in idle or inactive mode: when the UE is performing cell measurements, and when the UE is performing cell re-selection.

Figure 2:
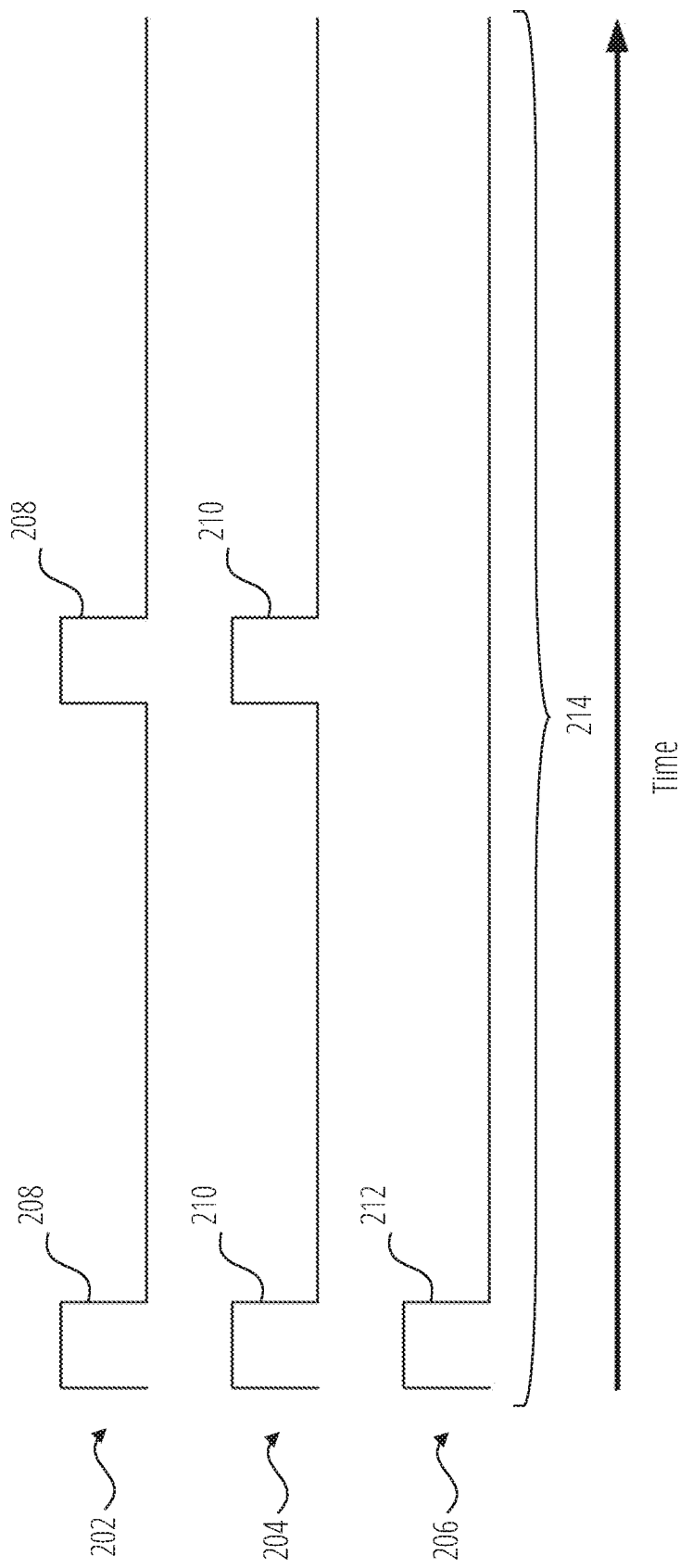
FIG. 2 illustrates a scenario that may occur when the UE is performing cell measurements while it is in idle or inactive mode.

FIG. 2 illustrates a scenario that may occur when the UE is performing cell measurements while it is in idle or inactive mode. In some network configurations, a UE in idle or inactive mode may be configured to take cell measurements on a target inter-frequency cell (e.g., a cell using the same frequency as the current serving cell and using an inter-frequency carrier) and a target intra-frequency cell (e.g., a cell using a different frequency of the current serving cell and using an intra-frequency carrier). These measurements may involve taking one or more of a reference signal received power (RSRP) or reference signal received quality (RSRQ) measurement of each target cell using the SSB(s) transmitted on the carriers of each respective target cell. Accordingly, the SSB(s) to be measured from the target inter-frequency cell may be received at the UE according to an inter-frequency carrier SMTC occasion periodicity 202, and the SSB(s) to be measured from the target intra-frequency cell may be received at the UE according to an intra-frequency carrier SMTC occasion periodicity 204 (when both such cells are available), as described above. At the same time, the UE in idle or inactive mode may further be configured to receive paging information (e.g., receive and decode information from one or more SSB blocks) from its current serving cell according to a discontinuous reception (DRX) periodicity 106.

FIG. 2 illustrates the case where the inter-frequency carrier SMTC occasion periodicity 202 and the intra-frequency carrier SMTC occasion periodicity 204 as set corresponding to periodicities found in an SMTC configuration or an SMTC2-LP configuration for each respective carrier are the same, and are half of the DRX periodicity 206. FIG. 2 further illustrates that the positions of the inter-frequency carrier SMTC occasion periodicity 202 and the intra-frequency carrier SMTC occasion periodicity 204 as set by an offset in an SMTC configuration for each respective carrier overlap (within a time value) of each other. In other words, the inter-frequency carrier SMTC occasions 208 occur up to the time value before the start or up to the time value after the end of the intra-frequency carrier SMTC occasions 210. The time value may be, for example, 1 millisecond, 3 milliseconds, or some other time value. Finally. FIG. 2 illustrates that one of the inter-frequency carrier SMTC occasions 208 and one of the intra-frequency carrier SMTC occasions 210 overlap (within a time value) with the DRX paging occasion 212. In other words, each of the one of the inter-frequency carrier SMTC occasions 208 and the one of the intra-frequency carrier SMTC occasions 210 occur up to the time value before the start or up to the time value after the end of the DRX paging occasion 212. The time value may be, for example, 1 millisecond, 3 milliseconds, or some other time value.

It is contemplated that under some network configurations presenting these overlapping conditions, it may occur that the inter-frequency carrier SMTC occasion periodicity 202 is 160 milliseconds, the intra-frequency carrier SMTC occasion periodicity 204 is 160 milliseconds, and the DRX periodicity 206 is 320 milliseconds.

Under these conditions (e.g., the overlapping conditions described above), it may not be possible for the UE to perform all three of 1) a measurement on the target inter-frequency cell during one of the inter-frequency carrier SMTC occasions 208, 2) a measurement on the target intra-frequency cell during one of the intra-frequency carrier SMTC occasions 210, and 3) paging reception from its serving cell during the DRX paging occasion 212 within a single DRX cycle 214. In some network configurations, it may be that a UE can only implement one single DRX for all reception/monitoring/measurement activities at the UE. It may be desirable, in some network configurations, that a UE configured to experience these overlapping conditions between the inter-frequency carrier SMTC occasion periodicity 202, the intra-frequency carrier SMTC occasion periodicity 204, and the DRX periodicity 206 cancel the measurement of the target inter-frequency cell, receive paging from its serving cell on the DRX paging occasion 212, and perform the measurement of the target intra-frequency cell on the one or the intra-frequency carrier SMTC occasions 210 that does not overlap the DRX paging occasion 212.

Accordingly, it may be desirable that a UE uses SMTC2-LP configurations for receiving SSB bursts of one or both of the inter-frequency carrier and the intra-frequency carrier where possible in order to receive the power- and resource-saving benefits described above, while also being capable of recognizing situations where using the periodicity(s) found in the SMTC2-LP configuration(s) for the SSB burst(s) of one or both of the inter-frequency carrier and the intra-frequency carrier might implicate the above-described problematic overlapping conditions and reacting by cancelling the measurement of the inter-frequency target cell.

Figure 3:
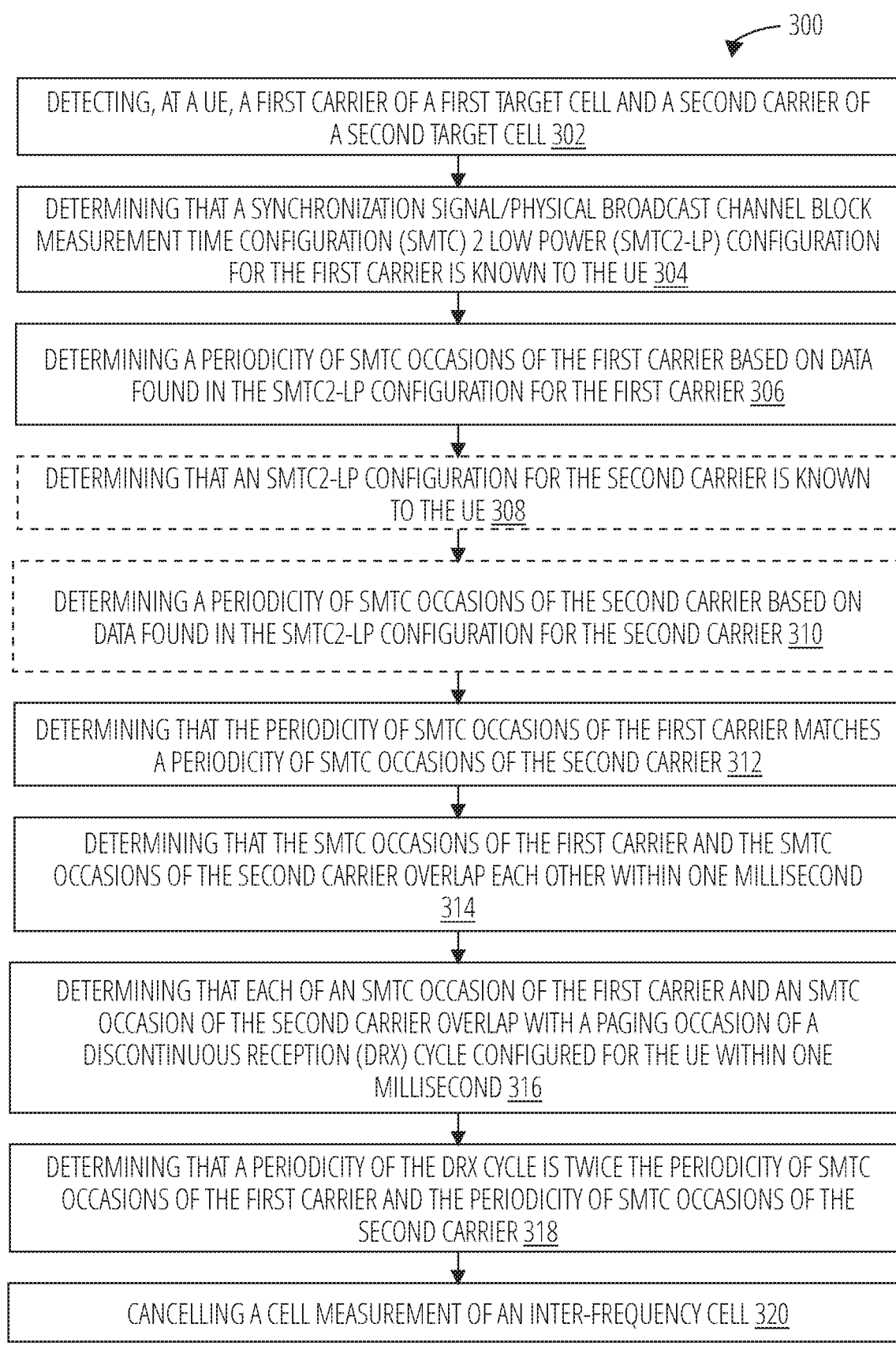
FIG. 3 illustrates a method of a UE, according to an embodiment.

FIG. 3 illustrates a method 300 of a UE, according to an embodiment. The method 300 includes detecting 302, at a UE, a first carrier of a first target cell and a second carrier of a second target cell. The first carrier and the second carrier may comprise an inter-frequency carrier and an intra-frequency carrier (with the first target cell and the second target cell correspondingly comprising an inter-frequency cell and an intra-frequency cell).

The method 300 further includes determining 304 that an SMTC2-LP configuration for the first carrier is known to the UE. For example, in some embodiments, one or more of an SMTC configuration and/or an SMTC2-LP configuration may be known at the UE for each of/either of the first carrier and the second carrier (e.g., as provided by the base station of its current serving cell to the UE during paging with the current serving cell).

The method 300 further includes determining 306 a periodicity of SMTC occasions of the first carrier based on data found in the SMTC2-LP configuration for the first carrier. For example, the UE may determine that the periodicity of SMTC occasions of the first carrier is a periodicity found in the data of the SMTC2-LP configuration for the first carrier (e.g., a periodicity indicated in the periodicity field 102 of the information element 100 of the SMTC2-LP configuration for the first carrier, as in FIG. 1).

In some embodiments, the UE may detemine that the periodicity of SMTC occasions of the first carrier is a periodicity found in the data of the SMTC2-LP configuration for the first carrier when a PCI of the first target cell is also present in the data of the SMTC2-LP configuration for the first carrier (e.g., when the PCI of the first target cell is in the PCI list 104 of the information element 100 of the SMTC2-LP configuration for the first carrier, as in FIG. 1). If the PCI of the first target cell is not present in the data of the SMTC2-LP configuration for the first carrier, the UE may instead use a periodicity of SMTC occasions based on information found in another location (e.g., a periodicity of an SMTC configuration for the first carrier). This check for the PCI of the first target cell in the data of the SMTC2-LP configuration for the first carrier may help the UE to more readily identify that the first target cell may be monitored according to the SMTC2-LP configuration for the first carrier (and therefore more readily receive the power- and resource-saving benefits of using the SMTC2-LP configuration described above). The presence of the PCI of the first target cell in the data of the SMTC2-LP configuration for the first carrier may indicate to the UE that the first target cell has been configured by the network to send SSB bursts according to the periodicity of the SMTC2-LP configuration for the first carrier (and not, e.g., a periodicity of an SMTC configuration for the first carrier).

The method 300 may optionally further include determining 308 that an SMTC2-LP configuration for the second carrier is known to the UE.

The method 300 may optionally further include determining 310 a periodicity of SMTC occasions of the second carrier based on data found in the SMTC2-LP configuration for the second carrier. For example, the UE may determine that the periodicity of SMTC occasions of the second carrier is a periodicity found in the data of the SMTC2-LP configuration for the second carrier (e.g., a periodicity indicated in the periodicity field 102 of the information element 100 of the SMTC2-LP configuration for the second carrier, as in FIG. 1).

In some embodiments, the UE may determine that the periodicity of SMTC occasions of the second carrier is a periodicity found in the data of the SMTC2-LP configuration for the second carrier when a PCI of the second target cell is also present in the data of the SMTC2-LP configuration for the second carrier (e.g., when the PCI of the second target cell is in the PCI list 104 of the information element 100 of the SMTC2-LP configuration for the second carrier, as in FIG. 1). In these embodiments, if the PCI of the second target cell is not present in the data of the SMTC2-LP configuration for the second carrier, the UE may instead use a periodicity of SMTC occasions of the second target cell based on information found in another location (e.g., a periodicity of an SMTC configuration for the second carrier). This check for the PCI of the second target cell in the data of the SMTC2-LP configuration for the second carrier may help the UE to more readily identify that the second target cell may be monitored according to according to the SMTC2-LP configuration for the second carrier (and therefore more readily receive the power- and resource-saving benefits of using the SMTC2-LP configuration described above). The presence of the PCI of the second target cell in the data of the SMTC2-LP configuration for the second carrier may indicate to the UE that the second target cell has been configured by the network to send SSB bursts according to the periodicity of the SMTC2-LP configuration for the second carrier (and not, e.g., a periodicity of an SMTC configuration for the second carrier).

In embodiments of the method 300 where the SMTC2-LP configuration for the second carrier is not known at the UE, the UE may instead determine that the periodicity of SMTC occasions of the second carrier is a periodicity found in data of another configuration for the second carrier (e.g., an SMTC configuration for the second carrier).

The method 300 further includes determining 312 that the periodicity of SMTC occasions of the first carrier (e.g., as determined by the foregoing analysis of the SMTC2-LP configuration for the first carrier) matches a periodicity of SMTC occasions of the second carrier.

The method 300 further includes determining 314 that the SMTC occasions of the first carrier and the SMTC occasions of the second carrier overlap each other within one millisecond (as that overlap is described above).

The method 300 further includes determining 316 that each of an SMTC occasion of the first carrier and an SMTC occasion of the second carrier overlap with a paging occasion of a DRX cycle configured for the UE within one millisecond (as that overlap is described above).

The method 300 further includes determining 318 that a periodicity of the DRX cycle is twice the periodicity of SMTC occasions of the first carrier and the periodicity of SMTC occasions of the second carrier.

The method 300 further includes cancelling 320 a cell measurement of an inter-frequency cell. By making the determinations 312-318, the UE may understand that that a problematic overlapping conditions (as described above) exist; the cancelling 320 may be in response to this determination.

It is anticipated that in some cases whether the cancelling 320 occurs, the periodicity of SMTC occasions of the first carrier may be 160 milliseconds, the periodicity of SMTC occasions of the second carrier may be 160 milliseconds, and the periodicity of the DRC cycle may be 320 milliseconds.

In the method 300, the first carrier may be an inter-frequency carrier and the second carrier may be an intra-frequency carrier, with the first target cell correspondingly being the inter-frequency cell and the second target cell correspondingly being an intra-frequency cell. Alternatively, the first carrier may be an intra-frequency carrier and the second carrier may be an inter-frequency carrier, with the first target cell correspondingly being an intra-frequency cell and the second target cell correspondingly being the inter-frequency cell.

While the method 300 has been expressed in terms of UE functionality, it is also anticipated that in an alternative scheme, a base station may recognize, based on a review of the SMTC configuration(s) and SMTC2-LP configuration(s) for an inter-frequency carrier and an intra-frequency carrier of the UE that are to be sent by the base station to the UE, that a use of the one or more SMTC2-LP configurations at the UE may result in the UE using the method 300 to perform a cancellation of the inter-frequency cell measurement. In these cases, to lessen the processing burden on the UE and to potentially avoid the cancellation of the inter-frequency cell measurement by the UE, the base station may react by cancelling the sending of at least one of the one or more of the SMTC2-LP configuration(s) to the UE.

Figure 4:
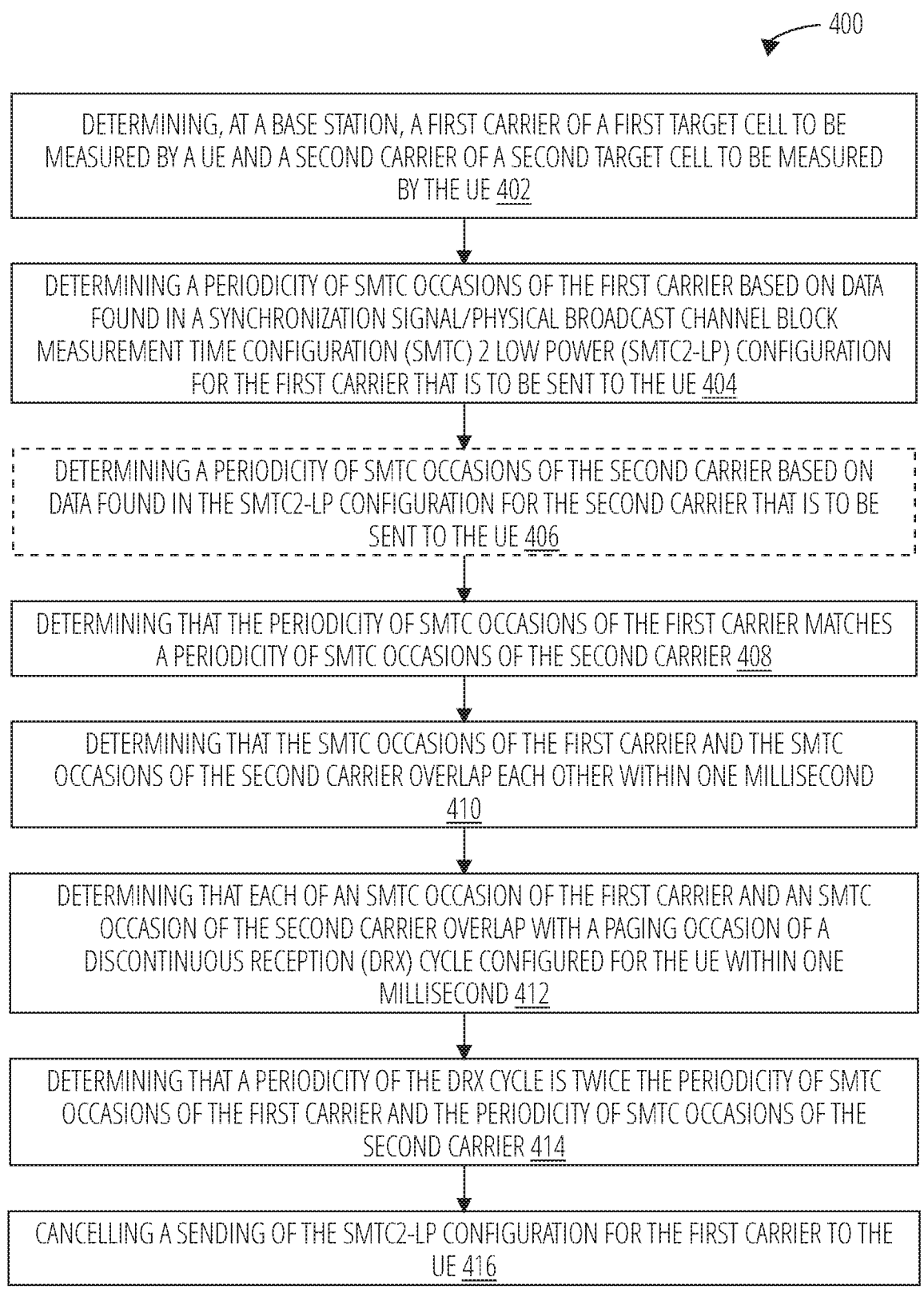
FIG. 4 illustrates a method of a base station, according to an embodiment.

FIG. 4 illustrates a method 400 of a base station, according to an embodiment. The method 400 includes determining 402, at a base station, a first carrier of a first target cell to be measured by a UE and a second carrier of a second target cell to be measured by the UE.

The method 400 further includes determining 404 a periodicity of SMTC occasions of the first carrier based on data found in an SMTC2-LP configuration for the first carrier that is to be sent to the UE. The base station may be aware of all configurations (e.g., SMTC configurations and SMTC2-LP configurations) sent to the UE, and therefore may perform this function as if it were the UE analyzing the SMTC2-LP configuration for the first carrier as described in relation to FIG. 3.

The method 400 further optionally includes determining 406 a periodicity of SMTC occasions of the second carrier based on data found in an SMTC2-LP configuration for the second carrier that is to be sent to the UE. The base station may be aware of all configurations (e.g., SMTC configurations and SMTC2-LP configurations) sent to the UE, and therefore may perform this function as if it were the UE analyzing the SMTC2-LP configuration for the second carrier as described in relation to FIG. 3.

In embodiments of the method 300 where the SMTC2-LP configuration for the second carrier is not to be transmitted to the UE, the base station may instead determine that the periodicity of SMTC occasions of the second carrier is a periodicity found in data of another configuration for the second carrier (e.g., an SMTC configuration for the second carrier).

The method 400 further includes determining 408 that the periodicity of SMTC occasions of the first carrier (as determined by the analysis of the SMTC2-LP configuration for the first carrier) matches a periodicity of SMTC occasions of the second carrier.

The method 400 further includes determining 410 that the SMTC occasions of the first carrier and the SMTC occasions of the second carrier overlap each other within one millisecond (as that overlap is described above).

The method 400 further includes determining 412 that each of an SMTC occasion of the first carrier and an SMTC occasion of the second carrier overlap with a paging occasion of a DRX cycle configured for the UE within one millisecond (as that overlap is described above).

The method 400 further includes determining 414 that a periodicity of the DRX cycle is twice the periodicity of SMTC occasions of the first carrier and the periodicity of SMTC occasions of the second carrier.

The method 400 further includes cancelling 416 a sending of the SMTC2-LP configuration for the first carrier to the UE. By making the determinations 408-414, the base station may understand that that problematic overlapping conditions (as described above) will exist of the UE is configure with the SMTC2-LP configuration for the first carrier; the cancelling 416 may be in response to this determination. In these cases, it may be that the base station sends a different SMTC2-LP configuration for the first carrier, and/or that the base station cancels sending any SMTC2-LP configuration for the first carrier altogether (and the UE therefore uses. e.g., an SMTC configuration for the first carrier to determine SMTC occasions of the first carrier instead). In either case, the result may be that the periodicity of SMTC occasions of the first carrier is determined by the UE to be a value other than the relevant periodicity value from the cancelled SMTC2-LP configuration, abrogating (at least a subset of) the problematic overlapping conditions (making them no longer problematic) and thereby avoiding the cancellation of the measurement of an inter-frequency cell by the UE.

It is anticipated that in some cases whether the cancelling 416 occurs, the periodicity of SMTC occasions of the first carrier may be 160 milliseconds, the periodicity of SMTC occasions of the second carrier may be 160 milliseconds, and the periodicity of the DRC cycle may be 320 milliseconds.

In the method 400, the first carrier may be an inter-frequency carrier and the second carrier may be an intra-frequency carrier, with the first target cell correspondingly being the inter-frequency cell and the second target cell correspondingly being an intra-frequency cell. Alternatively, the first carrier may be an intra-frequency carrier and the second carrier may be an inter-frequency carrier, with the first target cell correspondingly being an intra-frequency cell and the second target cell correspondingly being the inter-frequency cell.

In some embodiments, it may be advantageous to configure the UE that is measuring a target inter-frequency cell and a target intra-frequency cell with the ability to select not to use an SMTC2-LP configuration for either (or both) of the cells.

Figure 5:
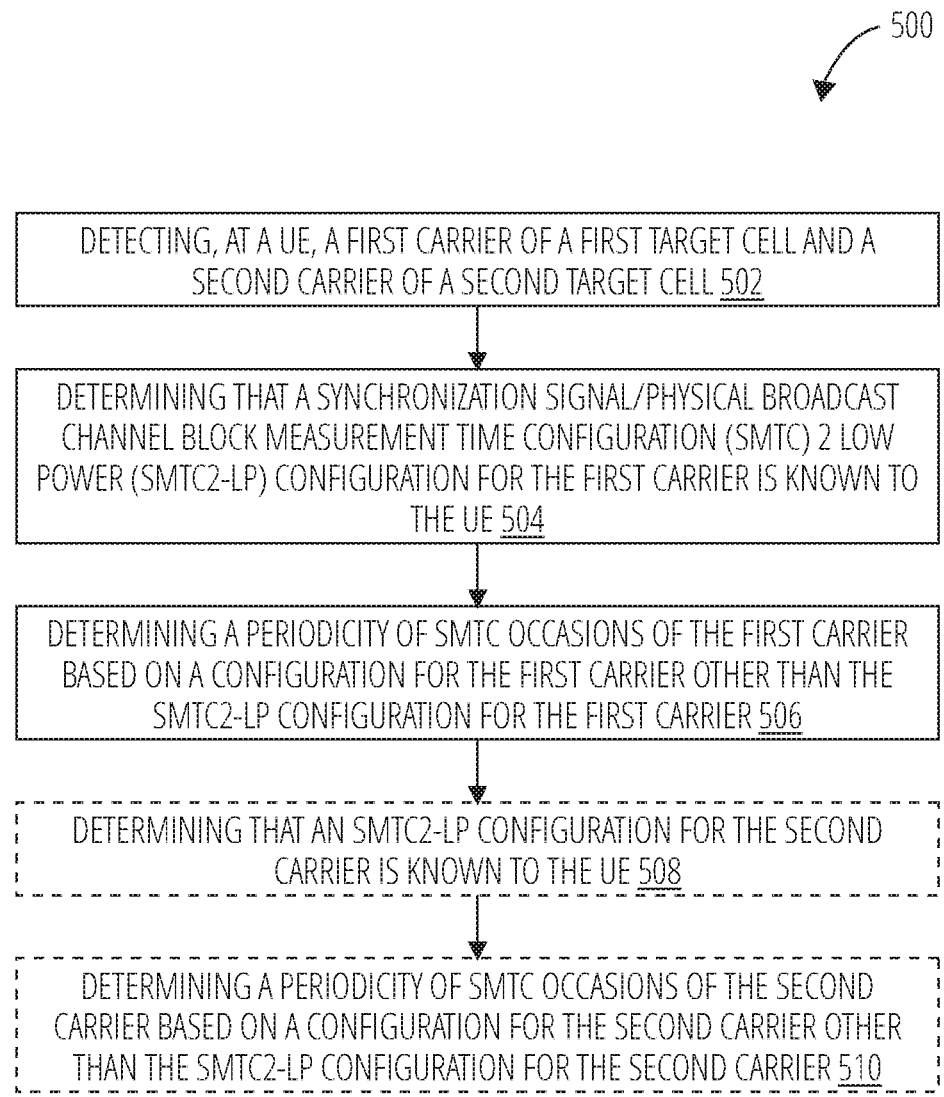
FIG. 5 illustrates a method of a UE according to an embodiment.

FIG. 5 illustrates a method 500 of a UE according to an embodiment. The method 500 includes detecting 502, at a UE, a first carrier of a first target cell and a second carrier of a second target cell.

The method 500 further includes determining 504 that an SMTC2-LP configuration for the first carrier is known to the UE.

The method 500 further includes determining 506 a periodicity of SMTC occasions of the first carrier based on a configuration for the first carrier other than the SMTC2-LP configuration for the first carrier. This other configuration may be, for example, an SMTC configuration for the first carrier that is known to the UE.

The method 500 further optionally includes determining 508 that an SMTC2-LP configuration for the second carrier is known to the UE.

The method 500 further optionally includes determining 510 a periodicity of SMTC occasions of the second carrier based on a configuration for the second carrier other than the SMTC2-LP configuration for the second carrier. This other configuration may be, for example, an SMTC configuration for the first carrier that is known to the UE.

In the method 500, the first carrier may be an inter-frequency carrier and the second carrier may be an intra-frequency carrier, with the first target cell correspondingly being an inter-frequency cell and the second target cell correspondingly being an intra-frequency cell. Alternatively, the first carrier may be an intra-frequency carrier and the second carrier may be an inter-frequency carrier, with the first target cell correspondingly being an intra-frequency cell and the second target cell correspondingly being an inter-frequency cell.

As introduced above, an SMTC2-LP configuration for a carrier on a target cell may be used by the UE during cell-reselection to the target cell. Specifically, the UE may determine whether to use a periodicity indicated the SMTC2-LP configuration for the carrier (instead of, e.g., a periodicity indicated in an SMTC configuration for the carrier) when receiving SSB burst(s) on from the target cell on the target carrier attendant to performing cell re-selection to the target cell. While switching from the current serving cell to the target cell, a maximum paging interruption time (e.g., a time period where the UE is not required to receiving paging information) may be calculated and respected by the UE. In some cases, this maximum paging interruption time may depend on a periodicity of SMTC occasions of the carrier of the target cell as determined based on data from the SMTC2-LP configuration for the carrier of the target cell.

Figure 6:
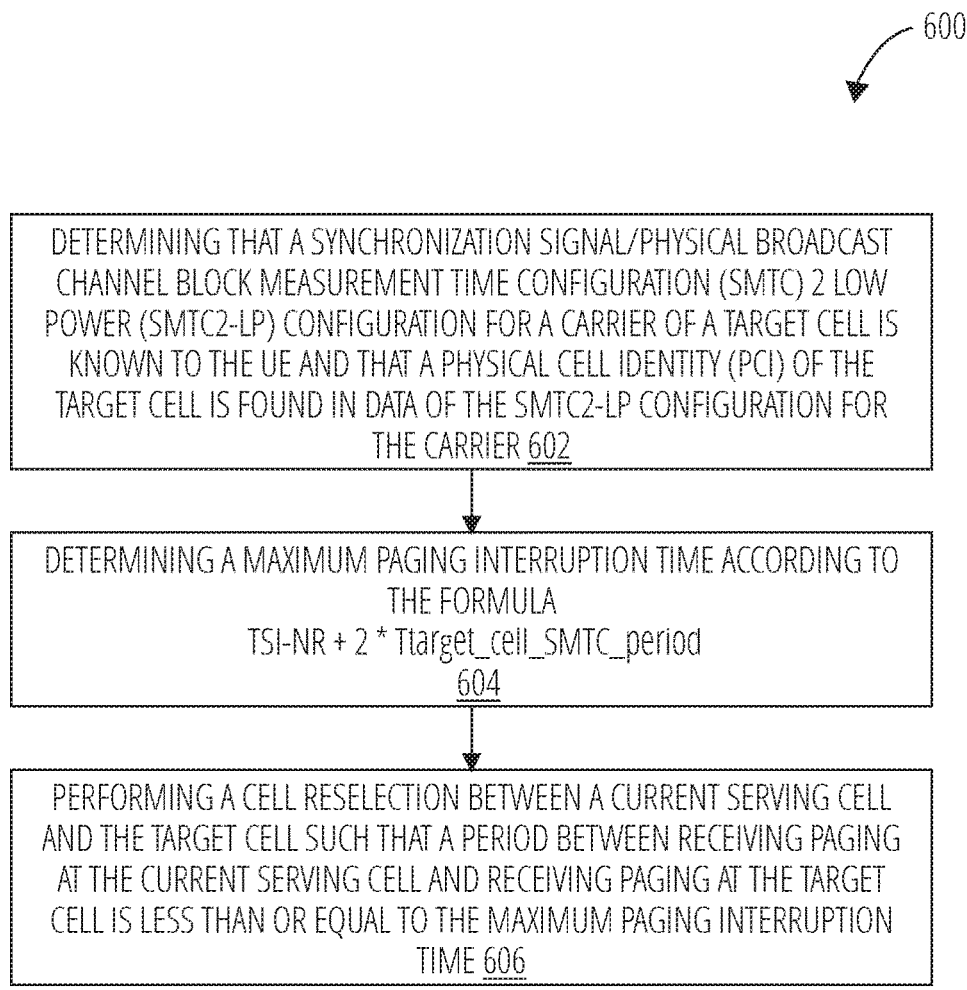
FIG. 6 illustrates a method of a UE, according to an embodiment.

FIG. 6 illustrates a method 600 of a UE, according to an embodiment. The method 600 includes determining 602 that an SMTC2-LP configuration for a carrier of a target cell is known to the UE and that a PCI of the target cell is found in data of the SMTC2-LP configuration for the carrier of the target cell. This check for the PCI of the target cell in the data of the SMTC2-LP configuration for the carrier may help the UE to more readily identify that the target cell may be monitored according to the SMTC2-LP configuration for the carrier (and therefore more readily receive the power- and resource-saving benefits of using the SMTC2-LP configuration described above). The presence of the PCI of the target cell in the data of the SMTC2-LP configuration for the carrier may indicate to the UE that the target cell has been configured by the network to send SSB bursts according to the periodicity of the SMTC2-LP configuration for the carrier (and not, e.g., a periodicity of an SMTC configuration for the carrier).

The method 600 further includes determining 604 a maximum paging interruption time according to the formula $T_{SI-NR}+2*T_{target\_cell\_SMTC\_period}$. $T_{SI-NR}$ may be time period for receiving relevant system information data according to a paging reception procedure and an RRC procedure delay of system information blocks for an NR cell. $T_{target\_cell\_SMTC\_period}$ may be a periodicity found in the data of the SMTC2-LP configuration for the carrier of the target cell.

The method 600 further includes performing 606 a cell reselection between a current serving cell and the target cell such that a period between receiving paging at the current serving cell and receiving paging at the target cell is less than or equal to the maximum paging interruption time.

The use of the periodicity indicated in the SMTC2-LP configuration for the carrier of the target cell may allow for a longer paging interruption time than would be permitted in the case that, e.g., a periodicity indicated in another configuration (e.g., an SMTC configuration) for the carrier of the target cell would allow if analogously so used. This ensures compatibility for cell-reselection in the case that the UE is configured with an SMTC2-LP configuration for the carrier of the target cell, without the UE having to take the time to re-configure with another configuration (e.g., an SMTC configuration) for the carrier of the target cell in order to complete the cell-reselection to the target cell. Accordingly, the UE and the network may continue to enjoy the power- and resource-saving benefits from using the SMTC2-LP configuration described above without interruption.

In the method 600, the carrier of the target cell may be an inter-frequency carrier, with the target cell correspondingly being an inter-frequency cell. In other cases, the carrier of the target cell may be an intra-frequency carrier, with the target cell correspondingly being an intra-frequency cell.

Figure 7:
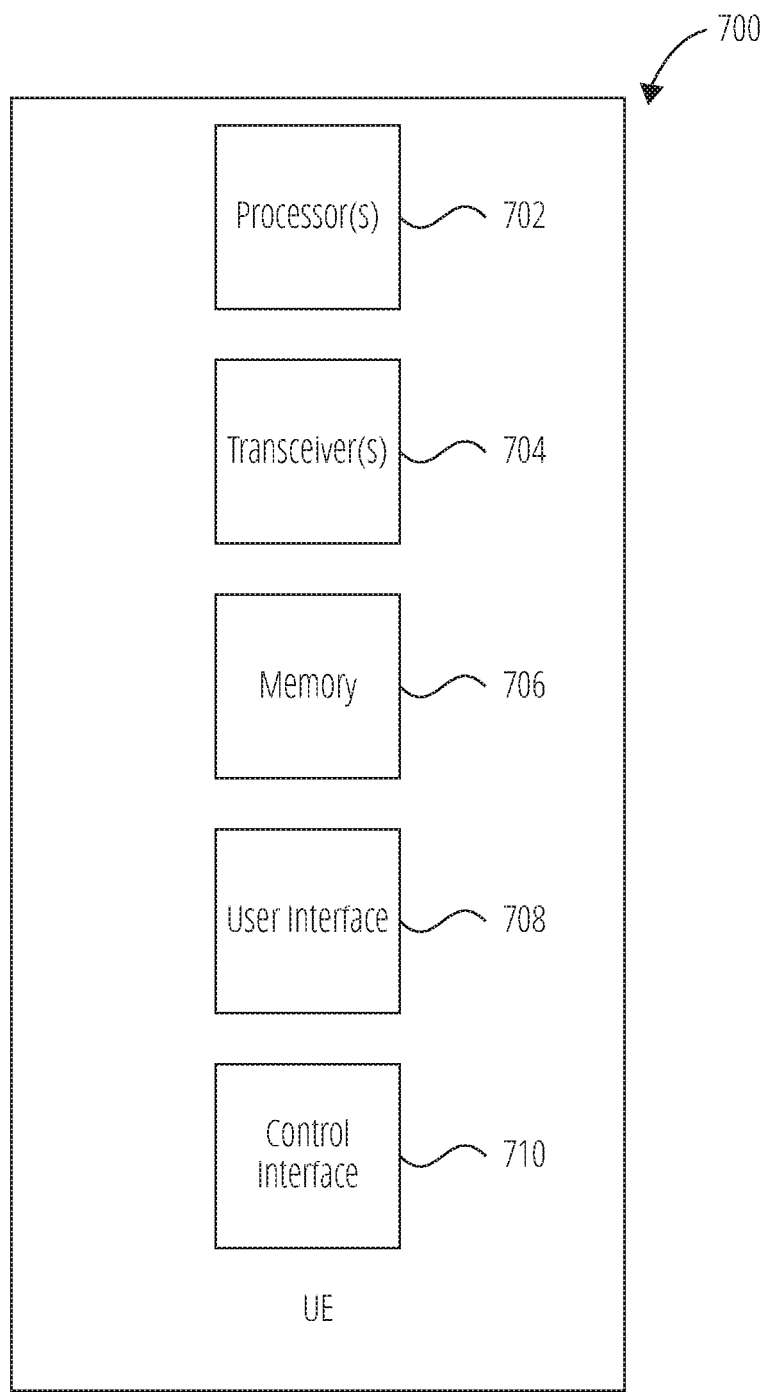
FIG. 7 illustrates a UE in accordance with one embodiment.

FIG. 7 is a block diagram of an example UE 700 configurable according to various embodiments of the present disclosure, including by execution of instructions on a computer-readable medium that correspond to any of the example methods and/or procedures described herein. The UE 700 comprises one or more processor 702, transceiver 704, memory 706, user interface 708, and control interface 710.

The one or more processor 702 may include, for example, an application processor, an audio digital signal processor, a central processing unit, and/or one or more baseband processors. Each of the one or more processor 702 may include internal memory and/or may include interface(s) to communication with external memory (including the memory 706). The internal or external memory can store software code, programs, and/or instructions for execution by the one or more processor 702 to configure and/or facilitate the UE 700 to perform various operations, including operations described herein. For example, execution of the instructions can configure the UE 700 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 704, user interface 708, and/or control interface 710. As another example, the one or more processor 702 may execute program code stored in the memory 706 or other memory that corresponds to MAC, RLC, PDCP, and RRC layer protocols standardized by 3GPP (e.g., for NR and/or LTE). As a further example, the processor 702 may execute program code stored in the memory 706 or other memory that, together with the one or more transceiver 704, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 706 may comprise memory area for the one or more processor 702 to store variables used in protocols, configuration, control, and other functions of the UE 700, including operations corresponding to, or comprising, any of the example methods and/or procedures described herein. Moreover, the memory 706 may comprise non-volatile memory (e.g., flash memory), volatile memory (e.g., static or dynamic RAM), or a combination thereof. Furthermore, the memory 706 may interface with a memory slot by which removable memory cards in one or more formats (e.g., SD Card, Memory Stick, Compact Flash, etc.) can be inserted and removed.

The one or more transceiver 704 may include radio-frequency transmitter and/or receiver circuitry that facilitates the UE 700 to communicate with other equipment supporting like wireless communication standards and/or protocols. For example, the one or more transceiver 704 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 702. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 704 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 702 to implement a PHY layer based on OFDM. OFDMA, and/or SC-FDMA technologies, such as described herein with respect to other figures.

The user interface 708 may take various forms depending on particular embodiments, or can be absent from the UE 700. In some embodiments, the user interface 708 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 700 may comprise a tablet computing device including a larger touchscreen display. In such embodiments, one or more of the mechanical features of the user interface 708 may be replaced by comparable or functionally equivalent virtual user interface features (e.g., virtual keypad, virtual buttons, etc.) implemented using the touchscreen display, as familiar to persons of ordinary skill in the art. In other embodiments, the UE 700 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 700 having a touch screen display are capable of receiving user inputs, such as inputs related to exemplary methods and/or procedures described herein or otherwise known to persons of ordinary skill in the art.

In some exemplary embodiments of the present disclosure, the UE 700 may include an orientation sensor, which can be used in various ways by features and functions of the U E 700. For example, the UE 700 can use outputs of the orientation sensor to determine when a user has changed the physical orientation of the UE 700's touch screen display. An indication signal from the orientation sensor can be available to any application program executing on the UE 700, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 710 may take various forms depending on particular embodiments. For example, the control interface 710 may include an RS-232 interface, an RS-485 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1260 can comprise an IEEE 802.3 Ethernet interface such as described above. In some embodiments of the present disclosure, the control interface 710 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 700 may include more functionality than is shown in FIG. 7 including, for example, a video and/or still-image camera, microphone, media player and/or recorder, etc. Moreover, the one or more transceiver 704 may include circuitry for communication using additional radio-frequency communication standards including Bluetooth. GPS, and/or others. Moreover, the one or more processor 702 may execute software code stored in the memory 706 to control such additional functionality. For example, directional velocity and/or position estimates output from a GPS receiver can be available to any application program executing on the UE 700, including various exemplary methods and/or computer-readable media according to various exemplary embodiments of the present disclosure.

Figure 8:
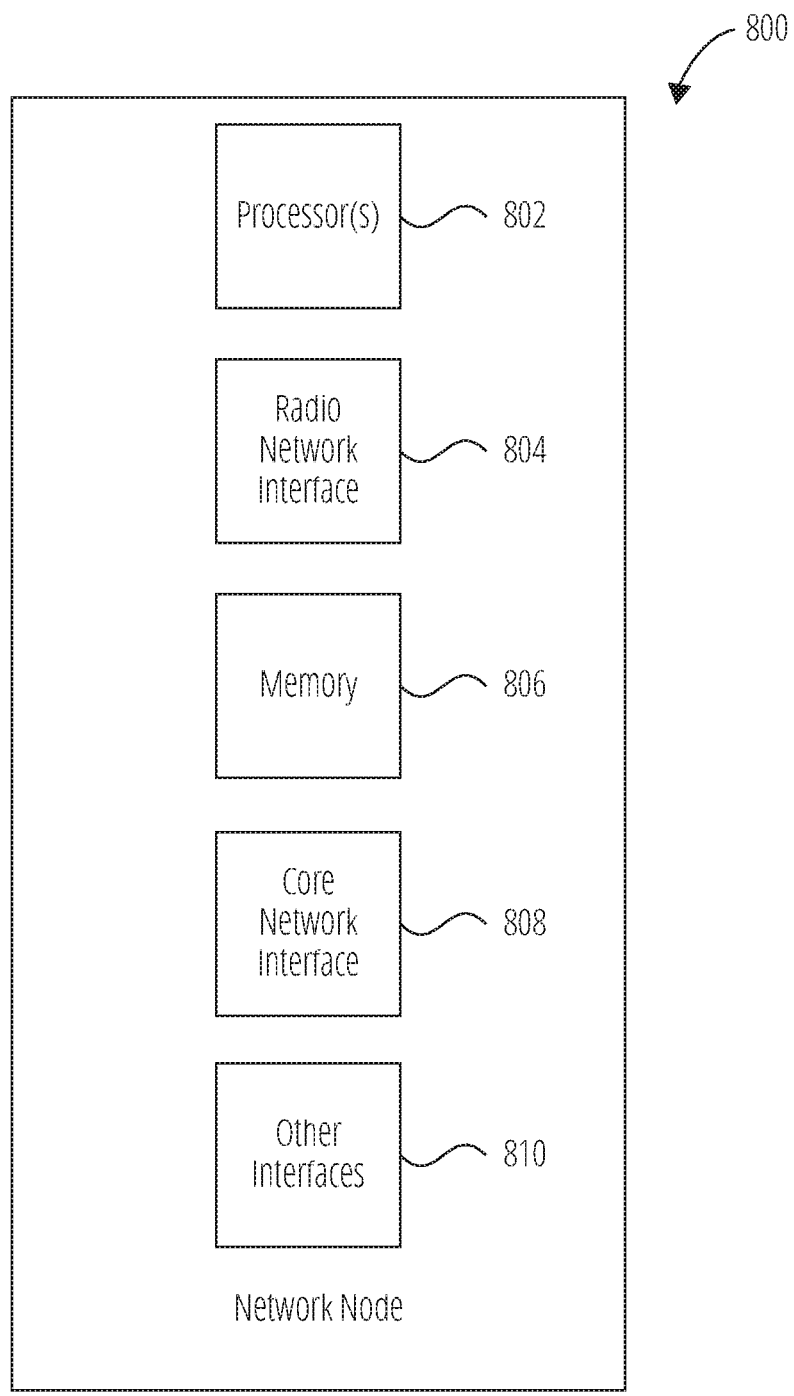
FIG. 8 illustrates a network node in accordance with one embodiment.

FIG. 8 is a block diagram of an example network node 800 configurable according to various embodiments of the present disclosure, including by execution of instructions on a computer-readable medium that correspond to any of the example methods and/or procedures described herein.

The network node 800 includes a one or more processor 802, a radio network interface 804, a memory 806, a core network interface 808, and other interfaces 810. The network node 800 may comprise, for example, a base station, eNB, gNB, access node, or component thereof.

The one or more processor 802 may include any type of processor or processing circuitry and may be configured to perform an of the methods or procedures disclosed herein. The memory 806 may store software code, programs, and/or instructions executed by the one or more processor 802 to configure the network node 800 to perform various operations, including operations described herein. For example, execution of such stored instructions can configure the network node 800 to communicate with one or more other devices using protocols according to various embodiments of the present disclosure, including one or more methods and/or procedures discussed above. Furthermore, execution of such stored instructions can also configure and/or facilitate the network node 800 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 804 and the core network interface 808. By way of example and without limitation, the core network interface 808 comprise an S1 interface and the radio network interface 804 may comprise a Uu interface, as standardized by 3GPP. The memory 806 may also store variables used in protocols, configuration, control, and other functions of the network node 800. As such, the memory 806 may comprise non-volatile memory (e.g., flash memory, hard disk, etc.), volatile memory (e.g., static or dynamic RAM), network-based (e.g., "cloud") storage, or a combination thereof.

The radio network interface 804 may include transmitters, receivers, signal processors, ASICs, antennas, beamforming units, and other circuitry that enables network node 800 to communicate with other equipment such as, in some embodiments, a plurality of compatible user equipment (UE). In some embodiments, the network node 800 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 804 may include a PHY layer based on OFDM, OFDMA, and/or SC-FDMA technologies. In some embodiments, the functionality of such a PHY layer can be provided cooperatively by the radio network interface 804 and the one or more processor 802.

The core network interface 808 may include transmitters, receivers, and other circuitry that enables the network node 800 to communicate with other equipment in a core network such as, in some embodiments, circuit-switched (CS) and/or packet-switched Core (PS) networks. In some embodiments, the core network interface 808 may include the S1 interface standardized by 3GPP. In some embodiments, the core network interface 808 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 808 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 810 may include transmitters, receivers, and other circuitry that enables the network node 800 to communicate with external networks, computers, databases, and the like for purposes of operations, administration, and maintenance of the network node 800 or other network equipment operably connected thereto.

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 9:
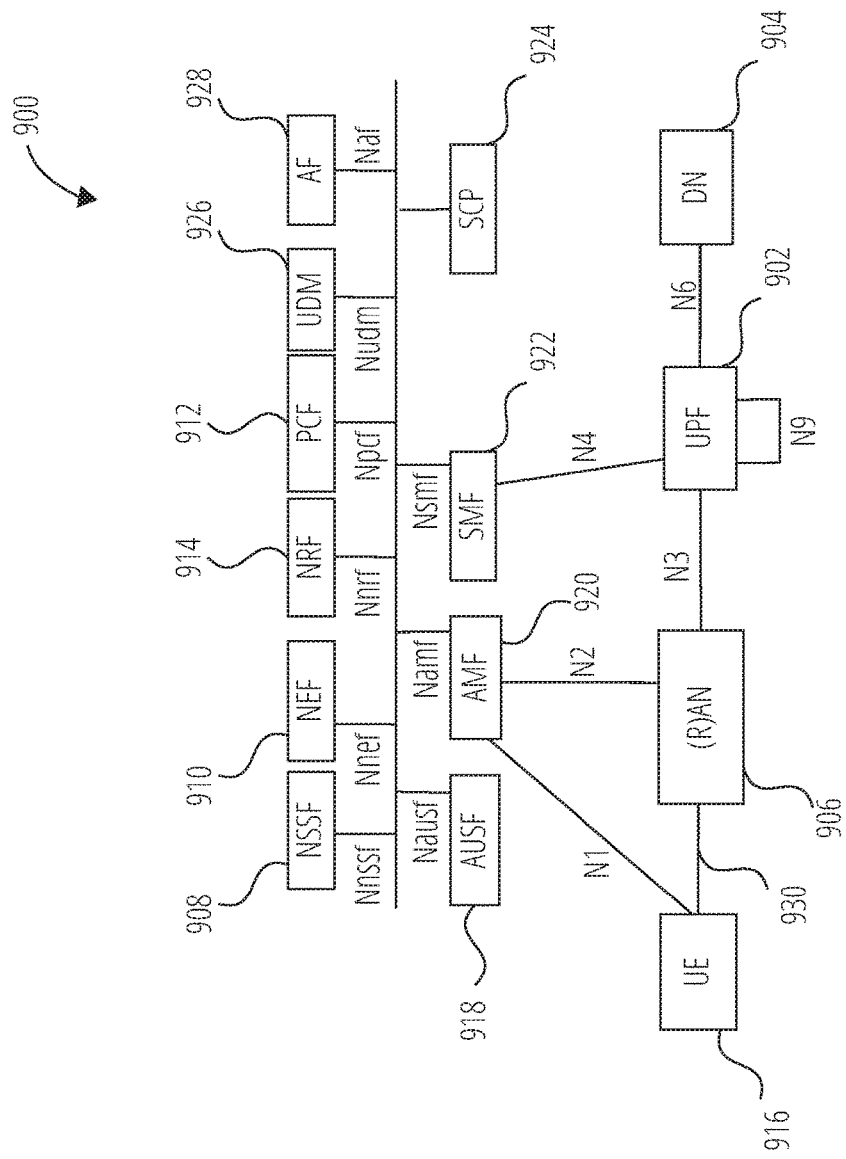
FIG. 9 illustrates an example service based architecture in accordance with certain embodiments.

FIG. 9 illustrates a service based architecture 900 in 5GS according to one embodiment. As described in 3GPP TS 23.501, the service based architecture 900 comprises NFs such as an NSSF 908, a NEF 910, an NRF 914, a PCF 912, a UDM 926, an AUSF 918, an AMF 920, an SMF 922, for communication with a UE 916, a (R)AN 906, a UPF 902, and a DN 904. The NFs and NF services can communicate directly, referred to as Direct Communication, or indirectly via a SCP 924, referred to as Indirect Communication. FIG. 9 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 9 are described below.

The NSSF 908 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 910 supports exposure of capabilities and events. NF capabilities and events may be securely exposed by the NEF 910 (e.g., for 3rd party, Application Functions, and/or Edge Computing). The NEF 910 may store/retrieve information as structured data using a standardized interface (Nudr) to a UDR. The NEF 910 may also secure provision of information from an external application to 3GPP network and may provide for the Application Functions to securely provide information to the 3GPP network (e.g., expected UE behavior, 5GLAN group information, and service specific information), wherein the NEF 910 may authenticate and authorize and assist in throttling the Application Functions. The NEF 910 may provide translation of internal-external information by translating between information exchanged with the AF 928 and information exchanged with the internal network function. For example, the NEF 910 translates between an AF-Service-Identifier and internal 5G Core information such as DNN and S-NS- SAI. The NEF 910 may handle masking of network and user sensitive information to external AF's according to the network policy. The NEF 910 may receive information from other network functions (based on exposed capabilities of other network functions), and stores the received information as structured data using a standardized interface to a UDR. The stored information can be accessed and re-exposed by the NEF 910 to other network functions and Application Functions, and used for other purposes such as analytics. For external exposure of services related to specific UE(s), the NEF 910 may reside in the HPLMN. Depending on operator agreements, the NEF 910 in the HPLMN may have interface(s) with NF(s) in the VPLMN. When a UE is capable of switching between EPC and 5GC, an SCEF+NEF may be used for service exposure.

The NRF 914 supports service discovery function by receiving an NF Discovery Request from an NF instance or SCP and providing the information of the discovered NF instances to the NF instance or SCP. The NRF 914 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 912 supports a unified policy framework to govern network behavior. The PCF 912 provides policy rules to Control Plane function(s) to enforce them. The PCF 912 accesses subscription information relevant for policy decisions in a Unified Data Repository (UDR). The PCF 912 may access the UDR located in the same PLMN as the PCF.

The UDM 926 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery. Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 926 uses subscription data (including authentication data) that may be stored in a UDR, in which case a UDM implements the application logic and may not require an internal user data storage and several different UDMs may serve the same user in different transactions. The UDM 926 may be located in the HPLMN of the subscribers it serves, and may access the information of the UDR located in the same PLMN.

The AUSF 918 supports authentication for 3GPP access and untrusted non-3GPP access. The AUSF 918 may also provide support for Network Slice-Specific Authentication and Authorization.

The AMF 920 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages. Access Authentication. Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 920. Regardless of the number of Network functions, in certain embodiments there is only one NAS interface instance per access network between the UE and the CN, terminated at one of the Network functions that implements at least NAS security and Mobility Management. The AMF 920 may also include policy related functionalities.

In addition to the functionalities described above, the AMF 920 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a co-ordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 922 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G V N group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of an SMF. However, in certain embodiments, not all of the functionalities are required to be supported in an instance of a Network Slice. In addition to the functionalities, the SMF 922 may include policy related functionalities.

The SCP 924 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 924 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 916 may include a device with radio communication capabilities. For example, the UE 916 may comprise a smartphone (e.g., handheld touchscreen mobile computing devices connectable to one or more cellular networks). The UE 916 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 916 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks.

The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 916 may be configured to connect or communicatively couple with the (R)AN 906 through a radio interface 930, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 916 and the (R)AN 906 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 906 to the UE 916 and a UL transmission may be from the UE 916 to the (R)AN 906. The UE 916 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 906 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 906 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 906) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 916 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 902 may act as an anchor point for intra-RAT and inter-RAT mobility, an external PDU session point of interconnect to the DN 904, and a branching point to support multi-homed PDU session. The UPF 902 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 902 may include an uplink classifier to support routing traffic flows to a data network. The DN 904 may represent various network operator services, Internet access, or third party services. The DN 904 may include, for example, an application server.

Figure 10:
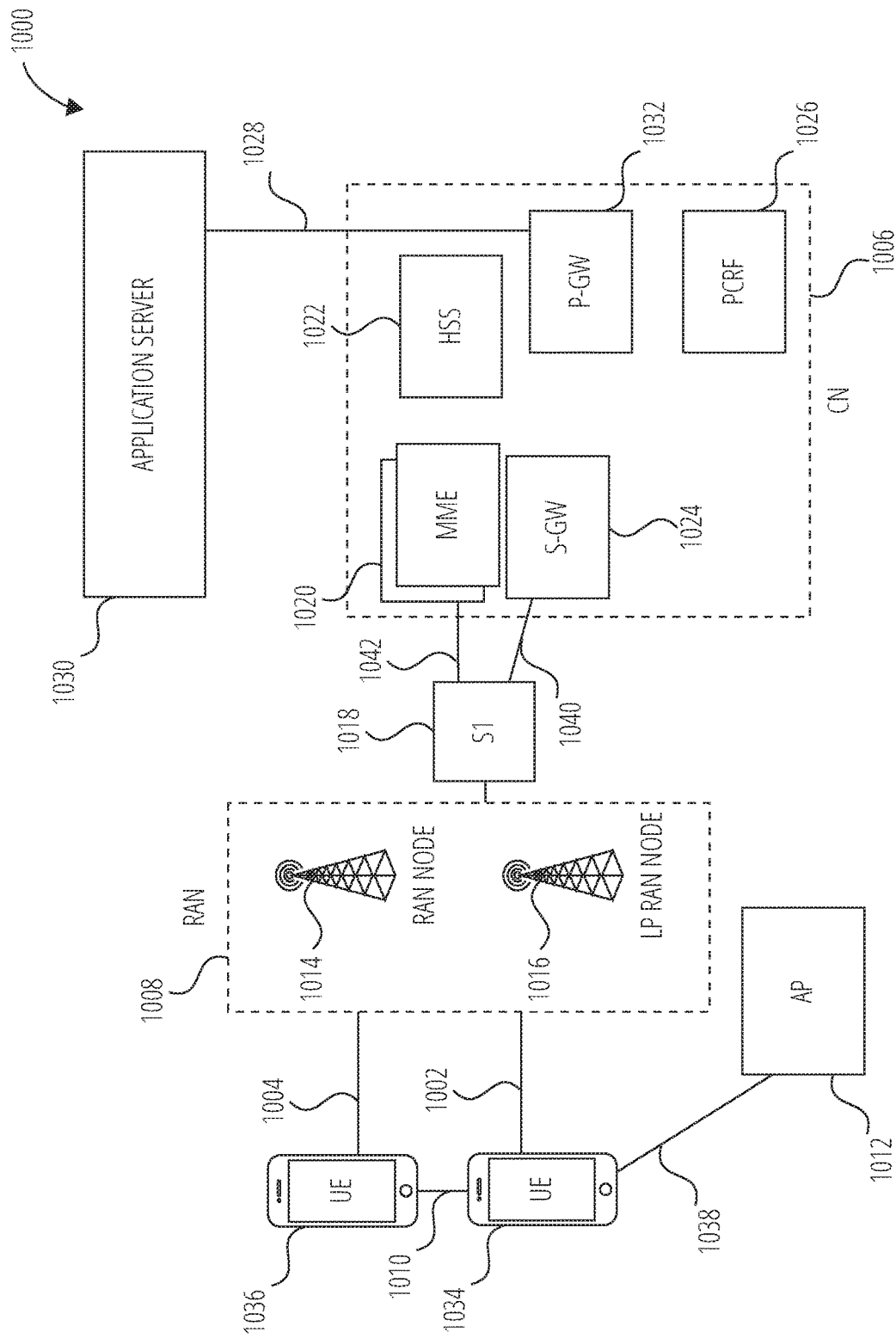
FIG. 10 illustrates a system in accordance with one embodiment.

FIG. 10 illustrates an architecture of a system 1000 of a network in accordance with some embodiments. The system 1000 includes one or more user equipment (UE), shown in this example as a UE 1036 and a UE 1034. The UE 1036 and the UE 1034 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1036 and the UE 1034 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1036 and the UE 1034 may be configured to connect, e.g., communicatively couple, with a radio access network (RAN), shown as RAN 1008. The RAN 1008 may be, for example, an Evolved Universal Mobile Telecommunications System (UMTS) Terrestrial Radio Access Network (E-UTRAN), a NextGen RAN (NG RAN), or some other type of RAN. The UE 1036 and the UE 1034 utilize connection 1004 and connection 1002, respectively, each of which comprises a physical communications interface or layer (discussed in further detail below); in this example, the connection 1004 and the connection 1002 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1036 and the UE 1034 may further directly exchange communication data via a ProSe interface 1010. The ProSe interface 1010 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1034 is shown to be configured to access an access point (AP), shown as AP 1012, via connection 1038. The connection 1038 can comprise a local wireless connection, such as a connection consistent with any IEEE 802.11 protocol, wherein the AP 1012 would comprise a wireless fidelity (WiFi®) router. In this example, the AP 1012 may be connected to the Internet without connecting to the core network of the wireless system (described in further detail below).

The RAN 1008 can include one or more access nodes that enable the connection 1004 and the connection 1002. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1008 may include one or more RAN nodes for providing macrocells, e.g., macro RAN node 1014, and one or more RAN nodes for providing femtocells or picocells (e.g., cells having smaller coverage areas, smaller user capacity, or higher bandwidth compared to macrocells), e.g., a low power (LP) RAN node such as LP RAN node 1016.

Any of the macro RAN node 1014 and the LP RAN node 1016 can terminate the air interface protocol and can be the first point of contact for the UE 1036 and the UE 1034. In some embodiments, any of the macro RAN node 1014 and the LP RAN node 1016 can fulfill various logical functions for the RAN 1008 including, but not limited to, radio network controller (RNC) functions such as radio bearer management, uplink and downlink dynamic radio resource management and data packet scheduling, and mobility management.

In accordance with some embodiments, the UE 1036 and the UE 1034 can be configured to communicate using Orthogonal Frequency-Division Multiplexing (OFDM) communication signals with each other or with any of the macro RAN node 1014 and the LP RAN node 1016 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 1014 and the LP RAN node 1016 to the UE 1036 and the UE 1034, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1036 and the UE 1034. The physical downlink control channel (PDCCH) may carry information about the transport format and resource allocations related to the PDSCH channel, among other things. It may also inform the UE 1036 and the UE 1034 about the transport format, resource allocation, and H-ARQ (Hybrid Automatic Repeat Request) information related to the uplink shared channel. Typically, downlink scheduling (assigning control and shared channel resource blocks to the UE 1034 within a cell) may be performed at any of the macro RAN node 1014 and the LP RAN node 1016 based on channel quality information fed back from any of the UE 1036 and UE 1034. The downlink resource assignment information may be sent on the PDCCH used for (e.g., assigned to) each of the UE 1036 and the UE 1034.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1008 is communicatively coupled to a core network (CN), shown as CN 1006—via an S1 interface 1018. In embodiments, the CN 1006 may be an evolved packet core (EPC) network, a NextGen Packet Core (NPC) network, or some other type of CN. In this embodiment the S1 interface 1018 is split into two parts: the S1-U interface 1040, which carries traffic data between the macro RAN node 1014 and the LP RAN node 1016 and a serving gateway (S-GW), shown as S-GW 1024, and an S1-mobility management entity (MME) interface, shown as S1-MME interface 1042, which is a signaling interface between the macro RAN node 1014 and LP RAN node 1016 and the MME(s) 1020.

In this embodiment, the CN 1006 comprises the MME(s) 1020, the S-GW 1024, a Packet Data Network (PDN) Gateway (P-GW) (shown as P-GW 1032), and a home subscriber server (HSS) (shown as HSS 1022). The MME(s) 1020 may be similar in function to the control plane of legacy Serving General Packet Radio Service (GPRS) Support Nodes (SGSN). The MME(s) 1020 may manage mobility aspects in access such as gateway selection and tracking area list management. The HSS 1022 may comprise a database for network users, including subscription-related information to support the network entities' handling of communication sessions. The CN 1006 may comprise one or several HSS 1022, depending on the number of mobile subscribers, on the capacity of the equipment, on the organization of the network, etc. For example, the HSS 1022 can provide support for routing/roaming, authentication, authorization, naming/addressing resolution, location dependencies, etc.

The S-GW 1024 may terminate the S1 interface 322 towards the RAN 1008, and routes data packets between the RAN 1008 and the CN 1006. In addition, the S-GW 1024 may be a local mobility anchor point for inter-RAN node handovers and also may provide an anchor for inter-3GPP mobility. Other responsibilities may include lawful intercept, charging, and some policy enforcement.

The P-GW 1032 may terminate an SGi interface toward a PDN. The P-GW 1032 may route data packets between the CN 1006 (e.g., an EPC network) and external networks such as a network including the application server 1030 (alternatively referred to as application function (AF)) via an Internet Protocol (IP) interface (shown as IP communications interface 1028). Generally, an application server 1030 may be an element offering applications that use IP bearer resources with the core network (e.g., UMTS Packet Services (PS) domain, LTE PS data services, etc.). In this embodiment, the P-GW 1032 is shown to be communicatively coupled to an application server 1030 via an IP communications interface 1028. The application server 1030 can also be configured to support one or more communication services (e.g., Voice-over-Internet Protocol (VoIP) sessions, PTT sessions, group communication sessions, social networking services, etc.) for the UE 1036 and the UE 1034 via the CN 1006.

The P-GW 1032 may further be a node for policy enforcement and charging data collection. A Policy and Charging Enforcement Function (PCRF) (shown as PCRF 1026) is the policy and charging control element of the CN 1006. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1032. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

Figure 11:
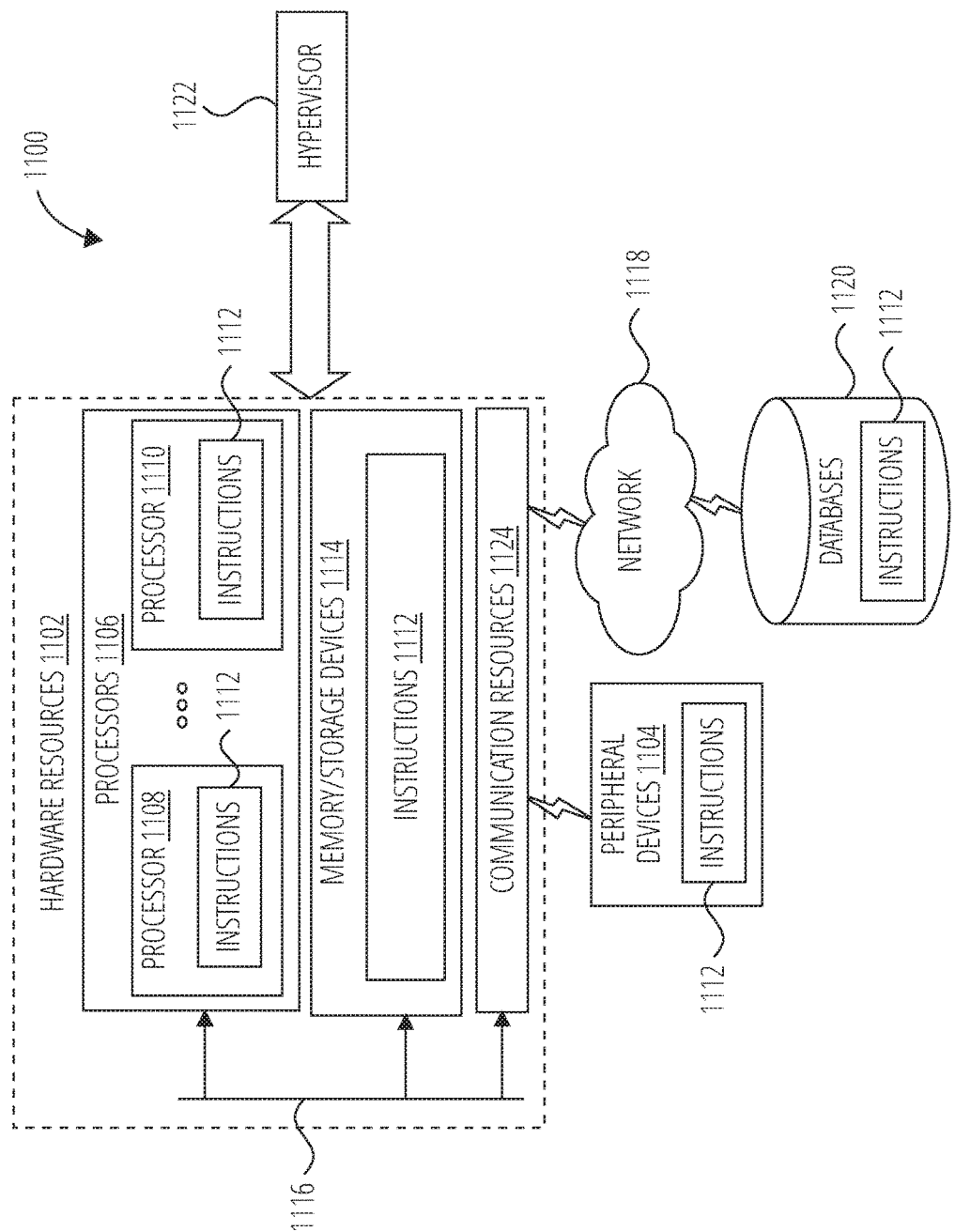
FIG. 11 illustrates components in accordance with one embodiment.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1106 (or processor cores), one or more memory/storage devices 1114, and one or more communication resources 1124, each of which may be communicatively coupled via a bus 1116. For embodiments where node virtualization (e.g., NFV) is utilized, a hypervisor 1122 may be executed to provide an execution environment for one or more network slices/sub-slices to utilize the hardware resources 1102.

The processors 1106 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1108 and a processor 1110.

The memory/storage devices 1114 may include main memory, disk storage, or any suitable combination thereof. The memory/storage devices 1114 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1124 may include interconnection or network interface components or other suitable devices to communicate with one or more peripheral devices 1104 or one or more databases 1120 via a network 1118. For example, the communication resources 1124 may include wired communication components (e.g., for coupling via a Universal Serial Bus (USB)), cellular communication components, NFC components. Bluetooth® components (e.g., Bluetooth® Low Energy), Wi-Fi® components, and other communication components.

Instructions 1112 may comprise software, a program, an application, an applet, an app, or other executable code for causing at least any of the processors 1106 to perform any one or more of the methodologies discussed herein. The instructions 1112 may reside, completely or partially, within at least one of the processors 1106 (e.g., within the processor's cache memory), the memory/storage devices 1114, or any suitable combination thereof. Furthermore, any portion of the instructions 1112 may be transferred to the hardware resources 1102 from any combination of the peripheral devices 1104 or the databases 1120. Accordingly, the memory of the processors 1106, the memory/storage devices 1114, the peripheral devices 1104, and the databases 1120 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method performed at a user equipment (UE), comprising: detecting, at the UE, a first carrier of a first target cell and a second carrier of a second target cell; determining that a synchronization signal/physical broadcast channel block measurement time configuration (SMTC) 2 low power (SMTC2-LP) configuration for the first carrier is known to the UE; determining a periodicity of SMTC occasions of the first carrier based on data found in the SMTC2-LP configuration for the first carrier; and cancelling a cell measurement of an inter-frequency cell if: the periodicity of SMTC occasions of the first carrier matches a periodicity of SMTC occasions of the second carrier; the SMTC occasions of the first carrier and the SMTC occasions of the second carrier overlap each other within one millisecond; each of an SMTC occasion of the first carrier and an SMTC occasion of the second carrier overlap with a paging occasion of a discontinuous reception (DRX) cycle configured for the UE within one millisecond; and a periodicity of the DRX cycle is twice the periodicity of SMTC occasions of the first carrier and the periodicity of SMTC occasions of the second carrier.

Example 2 is the method of Example 1, wherein the UE determines that the periodicity of SMTC occasions of the first carrier is a periodicity found in the data of the SMTC2-LP configuration for the first carrier.

Example 3 is the method of Example 1, wherein the UE determines that the periodicity of SMTC occasions of the first carrier is an periodicity found in the data of the SMTC2-LP configuration for the first carrier when a physical cell identity (PCI) of the first target cell is present in the data of the SMTC2-LP configuration for the first carrier.

Example 4 is the method of Example 1, further comprising determining that an SMTC configuration for the first carrier is known to the UE; wherein the UE determines that the periodicity of SMTC occasions of the first carrier is a periodicity found in the SMTC configuration for the first carrier when a physical cell identity (PCI) of the first target cell is not present in the data of the SMTC2-LP configuration for the first carrier.

Example 5 is the method of any of Examples 1-4, further comprising determining that an SMTC2-LP configuration for the second carrier is known to the UE.

Example 6 is the method of Example 5, wherein the periodicity of SMTC occasions of the second carrier is determined based on data found in the SMTC2-LP configuration for the second carrier.

Example 7 is the method of Example 6, wherein the UE determines that the periodicity of SMTC occasions of the second carrier is a periodicity found in the data of the SMTC2-LP configuration for the second carrier.

Example 8 is the method of Example 6, wherein the UE determines that the periodicity of SMTC occasions of the second carrier is a periodicity found in the data of the SMTC2-LP configuration for the second carrier when a physical cell identity (PCI) of the second target cell is present in the data of the SMTC2-LP configuration for the second carrier.

Example 9 is the method of Example 6, further comprising determining that an SMTC configuration for the second carrier is known to the UE; wherein the UE determines that the periodicity of SMTC occasions of the second carrier is a periodicity found in the SMTC configuration for the second carrier when a physical cell identity (PCI) of the second target cell is not present in the data of the SMTC2-LP configuration for the second carrier.

Example 10 is the method of any of Examples 1-9, wherein the cell measurement of the inter-frequency cell is cancelled when the periodicity of SMTC occasions of the first carrier is 160 milliseconds, the periodicity of the SMTC occasions of the second carrier is 160 milliseconds, and wherein the DRX cycle configured for the UE is 320 milliseconds.

Example 11 is the method of any of Examples 1-10, wherein: the first carrier is an inter-frequency carrier and the first cell is the inter-frequency cell, and; the second carrier is an intra-frequency carrier and the second cell is an intra-frequency cell.

Example 12 is the method of any of Examples 1-10, wherein: the first carrier is an intra-frequency carrier and the first cell is an intra-frequency cell, and; the second carrier is an inter-frequency carrier and the second cell is the inter-frequency cell.

Example 13 is a method performed by a user equipment (UE), comprising: determining that a synchronization signal/physical broadcast channel block measurement time configuration (SMTC) 2 low power (SMTC2-LP) configuration for a carrier being of a target cell is known to the UE and that a physical cell identity (PCI) of the target cell is found in data of the SMTC2-LP configuration for the carrier; and in response to determining that the SMTC2-LP configuration for the carrier is known to the UE and that the PCI of the target cell is found in the data of the SMTC2-LP configuration for the carrier; determining a maximum paging interruption time according to the formula $T_{SI-NR} + 2*T_{target\_cell\_SMTC\_period}$, where: $T_{SI-NR}$ is a time period for receiving relevant system information data according to a paging reception procedure and an RRC procedure delay of system information blocks for an NR cell; and $T_{target\_cell\_SMTC\_period}$ is a periodicity found in the data of the SMTC2-LP configuration for the carrier; and performing a cell reselection between a current serving cell and the target cell such that a period between receiving paging at the current serving cell and receiving paging at the target cell is less than or equal to the maximum paging interruption time.

Example 14 is the method of Example 13, wherein the carrier is an inter-frequency carrier and the target cell is an inter-frequency cell.

Example 15 is the method of Example 13, wherein the carrier is an intra-frequency carrier and the target cell is an intra-frequency cell.

Example 16 is a method performed by a user equipment (UE), comprising: detecting, at the UE, a first carrier of a first target cell and a second carrier of a second target cell; determining that a synchronization signal/physical broadcast channel block measurement time configuration (SMTC) 2 low power (SMTC2-LP) configuration for the first carrier is known to the UE; and determining a periodicity of SMTC occasions of the first carrier based on a configuration for the first carrier other than the SMTC2-LP configuration for the first carrier.

Example 17 is the method of Example 16, further comprising: determining that an SMTC2-LP configuration for the second carrier is known to the UE; and determining a periodicity of SMTC occasions of the second carrier based on a configuration for the second carrier other than the SMTC2-LP configuration for the second carrier.

Example 18 may include an apparatus comprising means to perform one or more elements of a method described in or related to any of the above Examples, or any other method or process described herein.

Example 19 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 20 may include an apparatus comprising logic, modules, or circuitry to perform one or more elements of a method described in or related to any of the above Examples, or any other method or process described herein.

Example 21 may include a method, technique, or process as described in or related to any of the above Examples, or portions or parts thereof.

Example 22 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 23 may include a signal as described in or related to any of the above Examples, or portions or parts thereof.

Example 24 may include a datagram, packet, frame, segment, protocol data unit (PDU), or message as described in or related to any of the above Examples, or portions or parts thereof, or otherwise described in the present disclosure.

Example 25 may include a signal encoded with data as described in or related to any of the above Examples, or portions or parts thereof, or otherwise described in the present disclosure.

Example 26 may include a signal encoded with a datagram, packet, frame, segment, PDU, or message as described in or related to any of the above Examples, or portions or parts thereof, or otherwise described in the present disclosure.

Example 27 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 28 may include a computer program comprising instructions, wherein execution of the program by a processing element is to cause the processing element to carry out the method, techniques, or process as described in or related to any of the above Examples, or portions thereof.

Example 29 may include a signal in a wireless network as shown and described herein.

Example 30 may include a method of communicating in a wireless network as shown and described herein.

Example 31 may include a system for providing wireless communication as shown and described herein.

Example 32 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method performed at a user equipment (UE), comprising:
   detecting, at the UE, a first carrier of a first target cell and a second carrier of a second target cell;
   determining that a synchronization signal/physical broadcast channel block measurement time configuration (SMTC) 2 low power (SMTC2-LP) configuration for the first carrier is known to the UE;
   determining a periodicity of SMTC occasions of the first carrier based on data found in the SMTC2-LP configuration for the first carrier; and
   cancelling a cell measurement of an inter-frequency cell in response to determining that:
      the periodicity of SMTC occasions of the first carrier matches a periodicity of SMTC occasions of the second carrier;
      the SMTC occasions of the first carrier and the SMTC occasions of the second carrier overlap each other within one millisecond;
      each of an SMTC occasion of the first carrier and an SMTC occasion of the second carrier overlap with a paging occasion of a discontinuous reception (DRX) cycle configured for the UE within one millisecond; and
      a periodicity of the DRX cycle is twice the periodicity of SMTC occasions of the first carrier and the periodicity of SMTC occasions of the second carrier.

2. The method of claim 1, wherein the UE determines that the periodicity of SMTC occasions of the first carrier is a periodicity found in the data of the SMTC2-LP configuration for the first carrier.

3. The method of claim 1, wherein the UE determines that the periodicity of SMTC occasions of the first carrier is an periodicity found in the data of the SMTC2-LP configuration for the first carrier when a physical cell identity (PCI) of the first target cell is present in the data of the SMTC2-LP configuration for the first carrier.

4. The method of claim 1, further comprising determining that an SMTC configuration for the first carrier is known to the UE; wherein the UE determines that the periodicity of SMTC occasions of the first carrier is a periodicity found in the SMTC configuration for the first carrier when a physical cell identity (PCI) of the first target cell is not present in the data of the SMTC2-LP configuration for the first carrier.

5. The method of claim 1, further comprising determining that an SMTC2-LP configuration for the second carrier is known to the UE.

6. The method of claim 5, wherein the periodicity of SMTC occasions of the second carrier is determined based on data found in the SMTC2-LP configuration for the second carrier.

7. The method of claim 6, wherein the UE determines that the periodicity of SMTC occasions of the second carrier is a periodicity found in the data of the SMTC2-LP configuration for the second carrier.

8. The method of claim 6, wherein the UE determines that the periodicity of SMTC occasions of the second carrier is a periodicity found in the data of the SMTC2-LP configuration for the second carrier when a physical cell identity (PCI) of the second target cell is present in the data of the SMTC2-LP configuration for the second carrier.

9. The method of claim 6, further comprising determining that an SMTC configuration for the second carrier is known to the UE; wherein the UE determines that the periodicity of SMTC occasions of the second carrier is a periodicity found in the SMTC configuration for the second carrier when a physical cell identity (PCI) of the second target cell is not present in the data of the SMTC2-LP configuration for the second carrier.

10. The method of claim 1, wherein the cell measurement of the inter-frequency cell is cancelled when the periodicity of SMTC occasions of the first carrier is 160 milliseconds, the periodicity of the SMTC occasions of the second carrier is 160 milliseconds, and wherein the DRX cycle configured for the UE is 320 milliseconds.

11. The method of claim 1, wherein:
   the first carrier is an inter-frequency carrier and the first cell is the inter-frequency cell, and;
   the second carrier is an intra-frequency carrier and the second cell is an intra-frequency cell.

12. The method of claim 1, wherein:
   the first carrier is an intra-frequency carrier and the first cell is an intra-frequency cell, and;
   the second carrier is an inter-frequency carrier and the second cell is the inter-frequency cell.

* * * * *